United States Patent [19]

Milani et al.

[11] Patent Number: 5,296,432
[45] Date of Patent: Mar. 22, 1994

[54] CATALYST FOR THE (CO) POLYMERIZATION OF ETHYLENE

[75] Inventors: Federico Milani, Maria Maddalena; Luciano Luciani, Ferrara; Maddalena Pondrelli, Budrio, all of Italy

[73] Assignee: ECP Enichem Polimeri S.r.l., Milan, Italy

[21] Appl. No.: 911,891

[22] Filed: Jul. 9, 1992

[30] Foreign Application Priority Data

Jul. 12, 1991 [IT] Italy .................. MI91 A/001936

[51] Int. Cl.$^5$ .................. C08F 4/657; C08F 4/685
[52] U.S. Cl. .................. 502/113; 502/104; 502/115; 502/120; 502/131; 526/125
[58] Field of Search .......... 502/113, 115, 104, 120, 502/131

[56] References Cited

U.S. PATENT DOCUMENTS

| 4,330,646 | 5/1982 | Sakurai et al. | 502/113 |
| 4,335,229 | 6/1982 | Sakurai et al. | 502/115 R |
| 4,387,045 | 7/1983 | Sakurai et al. | 502/115 X |
| 4,471,066 | 9/1984 | Sakurai et al. | 502/113 |

FOREIGN PATENT DOCUMENTS

| 0029623 | 6/1981 | European Pat. Off. . |
| 0177189 | 4/1986 | European Pat. Off. . |
| 2059973 | 4/1981 | United Kingdom . |

OTHER PUBLICATIONS

A. V. Kryzhanovskii et al., Modification of a Supported TICL4/MGCL$_2$ Catalyst by SNCL, 1990 Plenum Publishing Corp. pp. 90–94.
Journal of Organometallic Chemistry, vol. 6, No. 5, Nov. 1966 pp. 521–527.
Journal of the American Chem. Society, vol. 76, p. 1169, Feb. 20, 1954.
Journal of the American Chem. Society, vol. 67, No. 1, Apr. 1945, pp. 540–547.

*Primary Examiner*—Patrick P. Garvin
*Attorney, Agent, or Firm*—George P. Hoare, Jr.

[57] ABSTRACT

Solid component of catalyst for the (co)polymerization of ethylene, including magnesium, halogen and titanium, obtained by:
(i) dissolution, in an inert organic solvent, of a magnesium dialkyl, or a magnesium alkyl halide, a tin halide (IV) and possibly also an alkyl halide and their contact until a granular solid precipitates from the solution;
(ii) contact of said granular solid and its interaction with a titanium halide, alkoxide or halo-alkoxide, to form a solid component of catalyst.

19 Claims, 1 Drawing Sheet

CATALYST FOR THE (CO) POLYMERIZATION OF ETHYLENE

DESCRIPTION

The present invention relates to a solid component of catalyst, the procedure for its preparation and its use in the polymerization of ethylene and copolymerization of ethylene with α-olefins.

It is well-known that ethylene, or α-olefins in general, can be polymerized using a low pressure procedure with Ziegler-Natta catalysts. These catalysts are generally composed of elements from groups IV to VI of the Periodic Table (compounds of transition metals), mixed with an organometallic compound, or hydride, of elements of groups I to III of the Periodic Table.

Also known is the preparation of catalytic components by treatment of solid products derived from anhydrous magnesium chloride, an electron-donor and titanium compounds (IV) with liquid halides of boron, aluminium, gallium, indium, tallium, tin or antimonium in their state of higher oxidation, as described for example in the European Patent Application publication number 29,623.

A. V. Kryzhanovskii et al, Okht, Nauchno—Proizvod "Plastipolimer"; Kinet. Katal. 1990, 31(1), 108-12, suggest the modification of a catalyst based on titanium tetrachloride and magnesium chloride with tin tetrachloride to increase the reaction order with respect to the concentration of ethylene. According to Italian Patent 1,153,856, organometallic compounds of tin hydride can increase the productivity of the catalyst, when they are used in homogeneous catalytic systems based on compounds of vanadium, in the copolymerization of ethylene with propylene. It is also known that chlorinated compounds such as silicon tetrachloride and tin tetrachloride produce metal alkyls by interaction with magnesium alkyls or halides of magnesium alkyl. The reaction which is mainly studied is $MgR^1R^2$ or $MgR^3X$ with $R^4_{(4-n)}SiCl_n$, wherein $R^1$, $R^2$, $R^3$ and $R^4$ are alkyl groups and X is a halogen. Eaborn C. E. in "Organo Silicon Compounds", Butterworths Scientific Pubblications", London 1960; Rochow E. G. in "The Chemistry of Silicon", New York, 1975; and Voorhoeve R. J. H. in "Organosilanes", Elsevier, New York, 1967, describe an alkylation reaction between a magnesium dialkyl, or a halide of magnesium alkyl, and silicon tetrachloride, which produces a solid non-crystalline compound. Similarly J. Am. Chem. Soc., Vol. 67, page 540, 1945; J. Am. Chem. Soc., Vol. 76, page 1169, 1954; and J. Organometallic Chem., Vol. 6, page 522, 1966, describe the alkylation reaction between a magnesium alkyl chloride and tin tetrachloride.

Figure 1:
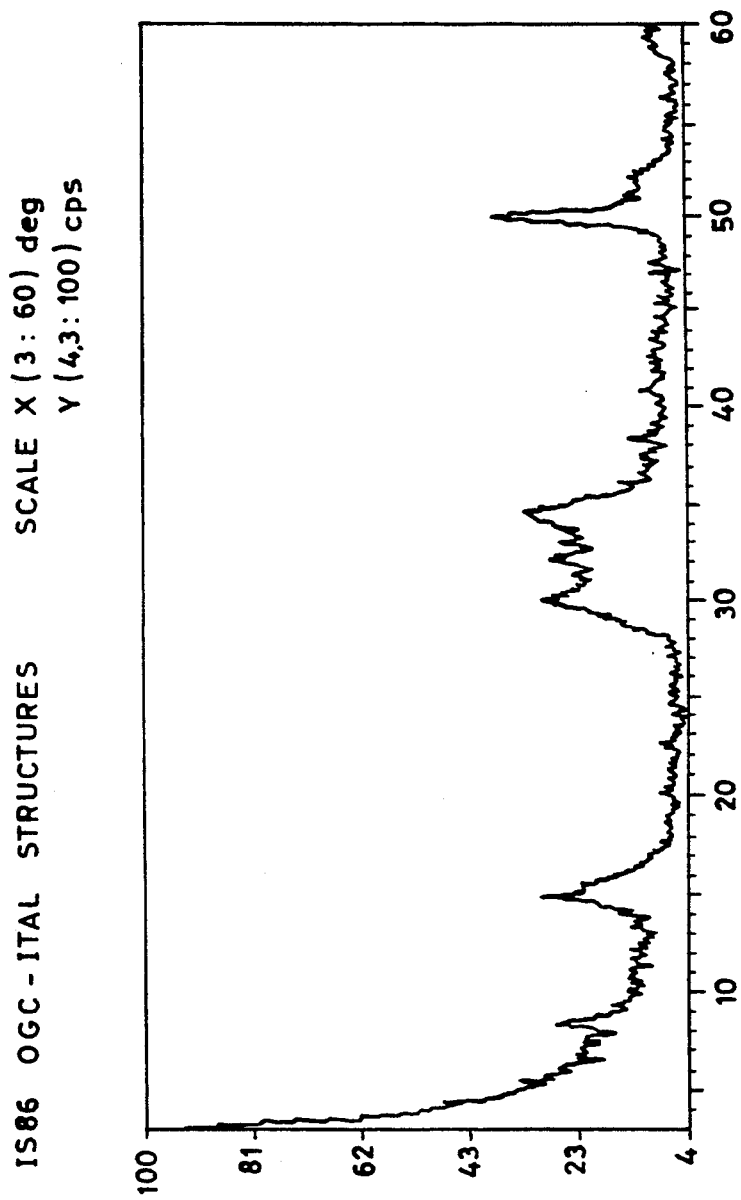
FIG. 1 is an X-ray spectrum of the solid product (support) produced by the precipitation reaction of tin tetrachloride and magnesium dialkyl.

It has now been found, according to the present invention, that the solid product of the interaction between a magnesium dialkyl or a halide of magnesium alkyl and tin chloride or a tin alkyl chloride, is capable of interacting with a compound of titanium to give a solid component of catalyst, which is highly active in the (co)polymerization of ethylene, wherein the ratio between the titanium in its tetravalent state and the titanium in its trivalent state is determined both by the ratio between tin and magnesium in the solid, and also by the concentration of titanium in the above interactions.

In accordance with this, one aspect of the present invention relates to a solid component of catalyst for the (co)polymerization of ethylene, including magnesium, halogen and titanium, obtained by:

(i) dissolution, in an inert organic solvent, of a magnesium dialkyl, or a halide of magnesium alkyl, a tin (IV) halide and possibly also an alkyl halide, with an atomic ratio between the tin, in the tin halide, and the magnesium, in the magnesium dialkyl or halide of magnesium alkyl, ranging from 0.1:1 to 15:1, and with a molar ratio between the alkyl halide and tin halide of 0:1 to 10:1, and their contact until a granular solid precipitates from the solution;

(ii) contact of said granular solid and its interaction with a titanium halide, alkoxide or halo-alkoxide, with an atomic ratio between the magnesium, in the granular solid, and the titanium, in the titanium compound, ranging from 0.01:1 to 60:1, to form a solid component of catalyst.

According to one embodiment, measured quantities of at least one compound of a metal M selected from vanadium, zirconium and hafnium are additionally introduced into the solution of step (i) to obtain solid components of catalysts suitable for the production of polymers and copolymers of ethylene with a wide molecular weight distribution.

According to another embodiment, the precipitation in step (i) is carried out in the presence of a solid material in particles, preferably silica, to give a supported solid component of catalyst.

In step (i) of the present invention a granular solid is precipitated from a solution, in an inert organic solvent, of a magnesium dialkyl or halide of magnesium alkyl, a tin halide and possibly also an alkyl halide.

Magnesium dialkyls which are suitable for the purpose are compounds which can be defined with the formula MgR'R", wherein R' and R", the same or different, each independently represent an alkyl group, linear or branched, containing from 1 to 10 carbon atoms. Specific examples of magnesium dialkyl are: magnesium diethyl, magnesium ethyl butyl, magnesium dihexyl, magnesium butyl octyl, and magnesium dioctyl. The corresponding halides, especially chlorides, of magnesium alkyl may also be used.

Tin halides which are suitable for the purpose are tin chlorides and bromides and preferably tin tetrachloride is used.

Alkyl halides which are suitable for the purpose are primary, secondary and tertiary alkyl chlorides and bromides, wherein the alkyl group contains from 1 to 20 carbon atoms. Specific examples of alkyl halides are: ethyl bromide, butyl chloride, hexyl chloride, octyl chloride and cyclohexyl chloride.

Suitable solvents for dissolving the above compounds are liquid organic solvents under the operating conditions and inert (not reactive) towards the other components. Examples of suitable solvents are hydrocarbons, especially aliphatic hydrocarbons, such as pentane, isopentane, hexane, heptane and octane.

Step (i) can be carried out by preparing a solution of magnesium dialkyl or halide of magnesium alkyl, and possibly alkyl halide in the selected organic solvent, adding the tin halide to this solution and maintaining the contact at a temperature of −30° C. to +30° C. to cause the precipitation of a granular solid. In practice, by operating under the above conditions, an almost complete precipitation is obtained in a period of 0.5 to 5 hours.

The granular solid precipitated in step (i) is conveniently separated from the liquid phase and washed thoroughly with an inert liquid solvent, especially a hydrocarbon solvent, such as hexane and heptane.

In step (ii), the solid obtained as described above, is put in contact and reacted with a titanium compound selected from titanium halides, alkoxides and halo-alkoxides. Specific examples of these compounds are: titanium tetrachloride, titanium tetrabromide, titanium tetra-n-propylate, titanium tetra-n-butylate, titanium tetra-i-propylate, titanium tetra-i-butylate and the corresponding titanium mono- or di-chloro alkoxides and mono- or di-bromo alkoxides. Mixtures of two or more of the above titanium compounds can be used. The preferred titanium compound is titanium tetrachloride.

In step (ii) the granular solid is suspended in an inert organic solvent, such as a hydrocarbon solvent, of the aliphatic type, for example hexane, heptane, octane etc., and the titanium compound, possibly dissolved in the same solvent or a similar solvent, is added to the suspension. The suspension thus obtained is kept at a temperature of 50 to 100° C. and preferably 60° to 90° C. for a period of 0.5 to 5 hours and preferably 1-2 hours. In this way a solid component of catalyst is obtained, which can be recovered from the relevant suspension by evaporating, for example, the organic solvent at atmospheric or reduced pressure.

When polyethylenes with a wider molecular weight distribution are desired, at least one compoud of a metal M selected from vanadium, zirconium and hafnium is added to the solution of step (i). The compound of metal M may be added in the form of a solution, in a suitable organic solvent, such as an alkyl ester, for example ethyl acetate. Suitable compounds for the purpose are halides, oxyhalides, alkoxides and halo-alkoxides, with preference for halides, such as for example vanadium trichloride and tribromide, zirconium tetrachloride and tetrabromide and hafnium tetrachloride and tetrabromide. In this method the atomic ratio between the magnesium, introduced with the magnesium dialkyl or magnesium alkyl halide, and the sum between titanium and the metal or metals M, ranges from 1:1 to 30:1 and the atomic ratio between the titanium and the metal or metals M ranges from 0.1:1 to 2:1.

When a supported solid component of catalyst is desired, a granular solid support, especially microspheroidal silica, is suspended in the solution of step (i), so that the precipitation of step (ii) is carried out in the presence of the support itself.

When tin tetrachloride and a magnesium dialkyl are used in the precipitation reaction of step (i), according to the present invention, it has been observed, by X-ray examination, that a solid product (support) is formed, composed of $MgCl_2$ (in its $\alpha$ and $\delta$ forms) together with a compound having an unknown structure and having an X-ray spectrum as shown in FIG. 1 enclosed. The relative quantities of the two forms, both known and unknown, of the support depend on the ratio between the magnesium dialkyl and tin tetrachloride reagents which interact in step (i) of the procedure, which influence the reactivity with the titanium compound in step (ii) and consequently the quantity of linked titanium and surprisingly enough the ratio between the titanium in its trivalent and tetravalent state. The quantity of titanium which is linked to the support in step (ii) also depends on the concentration of the titanium compound in said step (ii). The ratio between the tetravalent and the trivalent form in the fixed titanium seems, on the other hand, to depend largely on the concentration of titanium in step (ii). It has finally been found that the activity carried out during polymerization by the solid component of catalyst obtained at the end of step (ii) increases when the quantity of titanium fixed to the support decreases.

All this leads to the conclusion that both known and unknown forms of the support contribute to give the solid component of catalyst the required characteristics and mainly a high catalytic activity in the (co)polymerization of ethylene.

The present invention also relates to catalysts for the (co)polymerization of ethylene, composed of the solid component of catalyst described above, combined with an organometallic compound of aluminium (co-catalyst) which can be selected from aluminium trialkyls and halides (especially chlorides) of aluminium alkyl, which contain from 1 to 6 carbon atoms in the alkyl portion. Among these aluminium trialkyls, aluminium triethyl, aluminium tributyl, aluminium triisobutyl and aluminium trihexyl are preferred. In the catalysts of the present invention the atomic ratio between the aluminium (in the co-catalyst) and the titanium (in the solid component of catalyst) generally varies from 0.5:1 to 1,000:1 and preferably from 50:1 to 200:1.

These catalysts are highly active in procedures for the polymerization of ethylene and the copolymerization of ethylene with $\alpha$-olefins and can be used in polymerizations carried out either by the suspension technique in an inert diluent, or in the gaseous phase, in a fluidized or stirred bed. The $\alpha$-olefins which can be copolymerized are generally those containing 3 to 15 carbon atoms, such as butene-1, hexene-1, 4-methylpentene-1, octene-1, undecene-1, 1,4-hexadiene and ethylidene norbornene. The general polymerization conditions are: temperature 50° to 100° C., total pressure 5 to 40 bar, with a ratio between the partial hydrogen and ethylene pressures of 0 to 10.

In all cases there is a high productivity in the olefinic polymer, and the polymer thus obtained has an excellent rheology and in particular is in the form of non-friable granules having a narrow particle size distribution.

The experimental examples which follow provide a better illustration of the present invention.

EXAMPLE 1

240 ml of a 20% by weight solution in n-heptane of magnesium butyl octyl ($Mg_1But_{1.5}Oct_{0.5}$; 35.0 g, 210 mmoles) and 12 ml of tin tetrachloride (26.6 g, 105 mmoles) are charged, under a nitrogen atmosphere, into a 500 ml flask equipped with a reflux cooler, mechanical stirrer and thermometer. The tin tetrachloride is added over of period of 15 minutes at a temperature of −20° C. The mixture is left to react for 1 hour at −20° C., and is then brought slowly (in 1. 5 hours) to a temperature of 20° C. The solid precipitated is separated by filtration, thoroughly washed with n-hexane and dried by evaporation of the solvent. 28.6 g of a support containing 16.4% by weight of magnesium and 49.7% by weight of chlorine is obtained.

10 g of the support thus obtained are treated for 1 hour, at a temperature of 90° C., with 100 ml of titanium tetrachloride (172 g, 907 mmoles). The solid is separated by filtration, throughly washed with n-hexane, and then dried by evaporation of the solvent.

5.3 g of a solid component of catalyst are obtained, containing 17.6% by weight of magnesium, 66.7% by weight of chlorine and 6.5% by weight of titanium, 48% of which is in the form of trivalent titanium.

The solid component of catalyst prepared as described above, is used in a test for the polymerization of ethylene. More specifically, the polymerization is carried out in an autoclave having a volume of 5 liters, containing 2 liters of n-hexane, using 500 mg of the solid component of catalyst and 7 mmoles of aluminium triethyl as co-catalyst. The process is carried out at 90° C., at a total pressure of 15 bar, for a period of 1.5 hours, in the presence of hydrogen, with a ratio between the hydrogen and ethylene pressures of 0.86.

A yield equal to 8.4 kg of polyethylene per gram of solid component of catalyst is obtained and the polyethylene thus obtained has the following characteristics:

| | |
|---|---|
| density: (ASTM D-1505) | 0.9631 g/ml |
| MFI (2.16 kg): (Melt Flow Index - ASTM D-1238) | 3.7 g/10' |
| MFR: (MFR = Melt Flow Index Ratio, defined as a ratio MFI (21.6 kg)/MFI (2.16 kg)). | 27.8 |
| apparent density: (ASTM D-1895) | 0.38 g/ml |

Moreover the polyethylene is in the form of granules having the following particles size distribution in µm:

| | |
|---|---|
| >2000 | 1.2% by weight |
| 2000< >1000 | 6.6% by weight |
| 1000< >500 | 7.4% by weight |
| 500< >250 | 17.7% by weight |
| 250< >125 | 38.5% by weight |
| 125< >63 | 24.6% by weight |
| <63 | 6.0% by weight |

EXAMPLE 2

10 g of the support, prepared as described in Example 1, are suspended in 100 ml of n-heptane and 0.55 g of titanium tetrachloride (2.9 mmoles) are added to the suspension. Contact is maintained for 1 hour at 90° C. and the suspension is then dried by evaporating the solvent.

9.5 g of a solid component of catalyst are obtained, containing 16.6% by weight of magnesium, 52.0% by weight of chlorine and 1.4% by weight of titanium, of which 40% is in the form of trivalent titanium.

The solid component of catalyst prepared as described above, is used in a test for the polymerization of ethylene. More specifically, the polymerization is carried out operating in an autoclave having a volume of 5 liters, containing 2 liters of n-hexane, using 25 mg of the solid component of catalyst and 7 mmoles of aluminium triethyl as co-catalyst. The operating temperature is 90° C., total pressure 15 bar, for a period of 1. 5 hours, in the presence of hydrogen, with a ratio between the hydrogen and ethylene pressures of 0.86.

A yield equal to 12.6 kg of polyethylene per gram of solid component of catalyst is obtained and the polyethylene thus obtained has the following characteristics:

| | |
|---|---|
| density: | 0.9590 g/ml |
| MFI (2.16 kg): | 1.68 g/10' |
| MFR: | 68.8 |

| -continued | |
|---|---|
| apparent density: | 0.35 g/ml. |

Moreover the polyethylene is in the form of granules with the following particle size distribution in µm:

| | |
|---|---|
| >2000 | 1.4% by weight |
| 2000< >1000 | 5.1% by weight |
| 1000< >500 | 10.1% by weight |
| 500< >250 | 28.2% by weight |
| 250< >125 | 35.5% by weight |
| 125< >63 | 16.5% by weight |
| <63 | 3.2% by weight |

EXAMPLE 3

480 ml of a 20% by weight solution in n-heptane of magnesium butyl octyl ($Mg_1But_{1.5}Oct_{0.5}$; 70.0 g, 420 mmoles) and 4.9 ml of tin tetrachloride (10.9 g, 42 mmoles) are charged, in a nitrogen atmosphere, into a 1,000 ml flask equipped with a reflux cooler, mechanical stirrer and thermometer. The tin tetrachloride is added over a period of 15 minutes at a temperature of −20° C. The mixture is left to react for 1 hour at −20° C., and is then brought slowly (in 1.5 hours) to a temperature of 20° C. The solid precipitate is separated by filtration, throughly washed with n-hexane and dried by evaporation of the solvent. 8.2 g of a support containing 21.8% by weight of magnesium and 49.5% by weight of chlorine are obtained.

7.0 g of the support thus obtained are suspended in 130 ml of n-heptane and 0.475 g of titanium tetrachloride (2.5 mmoles) are added to the suspension. Contact is maintained for 1 hour at 90° C. and the suspension is finally dried by evaporating the solvent.

6.6 g of a solid component of catalyst are thus obtained, containing 22.7% by weight of magnesium, 56.7% by weight of chlorine and 1.5% by weight of titanium completely in a tetravalent form.

The solid component of catalyst prepared as described above is used in a test for the polymerization of ethylene. More specifically, the polymerization is carried out in an autoclave having a volume of 5 liters, containing 2 liters of n-hexane, using 50 mg of the solid component of catalyst and 1.5 mmoles of aluminium triethyl as co-catalyst. The operating temperature is 90° C., total pressure 15 bar, for a period of 1.5 hours, in the presence of hydrogen, with a ratio between the hydrogen and ethylene pressures of 0.86.

A yield equal to 1.9 kg of polyethylene per gram of solid component of catalyst is obtained and the polyethylene thus obtained has the following characteristics:

| | |
|---|---|
| density: | 0.9601 g/ml |
| MFI (2.16 kg): | 2.26 g/10' |
| MFR: | 30.0 |
| apparent density: | 0.20 g/ml. |

Moreover, the polyethylene is in the form of granules with the following particle size distribution in µm:

| | |
|---|---|
| >2000 | 14.8% by weight |
| 2000< >1000 | 32.0% by weight |
| 1000< >500 | 26.2% by weight |
| 500< >250 | 17.2% by weight |
| 250< >125 | 8.2% by weight |
| 125< >63 | 1.2% by weight |

| | |
|---|---|
| <63 | 0.4% by weight |

EXAMPLE 4

240 ml of a 20% by weight solution in n-heptane of magnesium butyl octyl ($MgiBut_{1.5}Oct_{0.5}$; 35.0 g, 210 mmoles) and 100 ml of tin tetrachloride (222 g, 852 mmoles) are charged, in a nitrogen atmosphere, into a 1,000 ml flask equipped with a reflux cooler, mechanical stirrer and thermometer. The tin tetrachloride is added over a period of 25 minutes at a temperature of $-20°$ C. The temperature is brought to 70° C. and the mixture is left to react for 1 hour. The solid precipitate is separated by filtration and throughly washed with n-heptane.

The support thus obtained is suspended in 200 ml of n-heptane and 1.72 g of titanium tetrachloride (9.1 mmoles) are added to the suspension. Contact is maintained for 2 hours at 90° C. and the suspension is finally dried by evaporating the solvent.

28.6 g of a solid component of catalyst are thus obtained, containing 17.2% by weight of magnesium, 54.2% by weight of chlorine and 0.1% by weight of titanium completely in its trivalent form.

The solid component of catalyst prepared as described above, is used in a test for the polymerization of ethylene. More specifically, the polymerization is carried out in an autoclave having a volume of 5 liters, containing 2 liters of n-hexane, using 50 mg of the solid component of catalyst and 1.0 mmoles of aluminium triethyl as co-catalyst. The solid component of catalyst is charged into the reactor together with 4.5 bar of hydrogen, at a temperature of 30° C. The reactor is brought to steady conditions, in 30 minutes, feeding ethylene up to a total pressure of 15 bar and increasing the temperature to 90° C. The polymerization is continued under these conditions for 60 minutes.

A yield equal to 2.1 kg of polyethylene per gram of solid component of catalyst is obtained and the polyethylene thus obtained has the following characteristics:

| | |
|---|---|
| density: | 0.9515 g/ml |
| MFI (2.16 kg): | 0.62 g/10' |
| MFR: | 24.7 |

EXAMPLE 5

90 ml of a 20-% by weight solution in n-heptane of magnesium butyl octyl ($MgiBut_{1.5}Oct_{0.5}$; 13.1 g, 78.8 mmoles), 80 ml of n-heptane and 6.31 g of hafnium tetrachloride (19.7 mmoles) are charged, in a nitrogen atmosphere, into a 500 ml flask equipped with a reflux cooler, mechanical stirrer and thermometer. The contents of the flask are heated for 14 minutes to a temperature of 40° C., then brought to $-20°$ C. and 18.8 ml of tin tetrachloride (41.1 g, 158 mmoles) are added over a period of 30 minutes. The temperature is brought to 25° C. over a period of 40 minutes and the mixture is left to react for 1 hour. The solid is separated by filtration, and throughly washed with n-heptane.

The washed solid is suspended in 200 ml of n-heptane and 3.78 g of titanium tetrachloride (19.9 mmoles) are added to the suspension. Contact is left for 1 hour at 90° C. and the suspension is finally dried by evaporating the solvent.

17.5 g of a solid component of catalyst are obtained, containing 9.6% by weight of magnesium, 46.9% by weight of chlorine, 0.12% by weight of titanium, of which 48% is in the form of trivalent titanium, and 20% by weight of hafnium.

The solid component of catalyst prepared as described above, is used in a test for the polymerization of ethylene. More specifically, the polymerization is carried out operating in an autoclave having a volume of 5 liters, containing 2 liters of n-hexane, using 150 mg of the solid component of catalyst and 3.0 mmoles of aluminium triethyl as co-catalyst. The operating conditions are: temperature 90° C., at a total pressure of 15 bar, for a period of 3 hours, in the presence of hydrogen, with a ratio between the hydrogen and ethylene pressures equal to 1.4.

A yield equal to 1.7 kg of polyethylene per gram of solid component of catalyst is obtained and the polyethylene thus obtained has the following characteristics:

| | |
|---|---|
| density: | 0.9482 g/ml |
| MFI (2.16 kg): | 0.46 g/10' |
| apparent density: | 0.29 g/ml |

Moreover the polyethylene is in the form of granules with the following particle size distribution in μm:

| | |
|---|---|
| >2000 | 9.3% by weight |
| 2000< >1000 | 14.0% by weight |
| 1000< >500 | 22.0% by weight |
| 500< >250 | 25.2% by weight |
| 250< >125 | 23.1% by weight |
| 125< >63 | 5.6% by weight |
| <63 | 0.4% by weight |

EXAMPLE 6

4.4 g of hafnium tetrachloride (13.7 mmoles) and 220 ml of ethyl acetate are charged, in a nitrogen atmosphere, into a 1,000 ml flask equipped with a reflux cooler, mechanical stirrer and thermometer. The temperature is brought to 77° C. for 1 hour until the hafnium salt has dissolved, 17 g of microspheroidal silica is then added and the mixture is left to react for 1 hour at 77° C. It is then dried by evaporating the solvent. 165 ml of n-heptane and 63 ml of a 20% by weight solution in n-heptane of magnesium butyl octyl ($MgiBut_{1.5}Oct_{0.5}$; 9.18 g, 55.1 mmoles) are added to the solid thus prepared. The reaction mixture is kept in contact for 30 minutes at a temperature of 60° C., the solid is then separated by filtration and throughly washed with n-heptane.

The washed solid is suspended in 160 ml of n-heptane and 55 ml of tin tetrachloride (122 g, 469 mmoles) are added to the suspension at a temperature of 25° C., over a period of 30 minutes. The suspension is maintained in contact for 1 hour at a temperature of 80° C., the solid is then separated by filtration and throughly washed with n-heptane.

160 ml of n-heptane and 2.75 g of titanium tetrachloride (14.5 mmoles) are added to the solid thus prepared. Contact is kept for 2 hours at 90° C. and the mixture is finally dried by evaporating the solvent.

24.8 g of a solid component of catalyst are thus obtained, containing 3.3% by weight of magnesium, 14.9% by weight of chlorine, 2.5% by weight of titanium, completely in its tetravalent form, and 10% by weight of hafnium.

The solid component of catalyst prepared as described above, is used in a test for the polymerization of ethylene. More specifically the polymerization is carried out operating in an autoclave having a volume of 5 liters, containing 2 liters of n-hexane, using 100 mg of the solid component of catalyst and 1.5 mmoles of aluminium triethyl as co-catalyst. The operating temperature is 80° C., at a total pressure of 15 bar, for a period of 4 hours, in the presence of hydrogen, with a ratio between the hydrogen and ethylene pressures of 0.2.

A yield equal to 7.8 kg of polyethylene per gram of solid component of catalyst is obtained and the polyethylene thus obtained has the following characteristics:

| density: | 0.9515 g/ml |
|---|---|
| MFI (2.16 kg): | 0.05 g/10' |
| MFR: | 74.6 |
| apparent density: | 0.38 g/ml. |

Moreover the polyethylene is in the form of granules with the following particles size distribution in μm:

| >2000 | 0.1% by weight |
|---|---|
| 2000< >1000 | 21.1% by weight |
| 1000< >500 | 61.6% by weight |
| 500< >250 | 15.4% by weight |
| 250< >125 | 1.5% by weight |
| 125< >63 | 0.3% by weight |
| <63 | 0.0% |

EXAMPLE 7

A solid component of catalyst is prepared operating as described in Example 6, but using 6.5 ml of tin tetrachloride (14.4 g, 55.4 mmoles).

31.8 g of a solid component of catalyst are obtained containing 3.1% by weight of magnesium, 14.5% by weight of chlorine, 2.8% by weight of titanium, completely in its tetravalent form, and 11% by weight of hafnium.

The solid component of catalyst prepared as described above, is used in a test for the polymerization of ethylene. More specifically, the polymerization is carried out operating in an autoclave having a volume of 5 liters, containing 2 liters of n-hexane, using 150 mg of the solid component of catalyst and 5.0 mmoles of aluminium triethyl as co-catalyst. The operating temperature is 80° C., at a total pressure of 15 bar, for a period of 4 hours, in the presence of hydrogen, with a ratio between the hydrogen and ethylene pressures of 0.45.

A yield equal to 2.9 kg of polyethylene per gram of solid component of catalyst is obtained and the polyethylene obtained has the following characteristics:

| density: | 0.9591 g/ml |
|---|---|
| MFI (2.16 kg): | 0.14 g/10' |
| MFI (21.6 kg): | 0.60 |
| MFR: | 67.9 |
| apparent density: | 0.40 g/ml |

Moreover the polyethylene is in the form of granules with the following particle size distribution in μm:

| >2000 | 0.0% by weight |
|---|---|
| 2000< >1000 | 7.0% by weight |
| 1000< >500 | 74.5% by weight |
| 500< >250 | 16.0% by weight |
| 250< >125 | 2.2% by weight |
| 125< >63 | 0.3% by weight |
| <63 | 0.0% by weight |

We claim:

1. Solid component of catalyst for the (co)polymerization of ethylene, including magnesium, halogen and titanium, obtained by:
   (i) dissolving, in an inert organic solvent, a magnesium dialkyl or a halide of magnesium alkyl, and a tin (IV) halide, with an atomic ratio between the tin, in said tin halide, and the magnesium, in said magnesium dialkyl or halide of magnesium alkyl, of 0.1:1 to 15:1, and contacting them until a granular solid precipitates from the solution;
   (ii) contacting and interacting said granular solid with a titanium halide, alkoxide or halo-alkoxide, with an atomic ratio between the magnesium, in said granular solid, and the titanium, in said titanium compound, of 0.01:1 to 60:1.

2. Solid component of catalyst according to claim 1, wherein the magnesium dialkyl is selected from the compounds which can be defined with the formula MgR'R'', wherein R' and R'', equal to or different from each other, each independently represent an alkyl group, linear or branched, containing from 1 to 10 carbon atoms.

3. Solid component of catalyst according to claim 2, wherein said magnesium dialkyl is selected from magnesium diethyl, magnesium ethyl butyl, magnesium dihexyl, magnesium butyl octyl, magnesium dioctyl.

4. Solid component of catalyst according to claim 1, wherein said tin (IV) halide is selected from tin chlorides and bromides.

5. Solid component with catalyst according to claim 1, wherein step (i) comprises further dissolving an alkyl halide in the inert organic solvent.

6. Solid component of catalyst according to claim 5 wherein the alkyl halide is selected from primary, secondary or tertiary alkyl chlorides and bromides, wherein the alkyl group contains from 1 to 20 carbon atoms.

7. Solid component of catalyst according to claim 1, wherein step (i) is carried out in a hydrocarbon solvent at a temperature of −30° C. to +30° C. and for a period of 0.5 to 5 hours.

8. Solid component of catalyst according to claim 1, wherein said titanium compound is selected from titanium tetrachloride, titanium tetrabromide, titanium tetra-n-propylate, titanium tetra-n-butylate, titanium tetra-i-propylate, titanium tetra-i-butylate and the corresponding titanium mono- or dichloro alkoxides and mono- or di-bromo alkoxides.

9. Solid component of catalyst according to claim 1, wherein step (ii) is carried out in a hydrocarbon solvent at a temperature of 50° to 100° C., for a period of 0.5 to 5 hours.

10. Solid component of catalyst according to claim 1, wherein, in step (i), at least one compound of a metal M selected from vanadium, zirconium and hafnium is also added, with an atomic ratio between the magnesium, introduced with the magnesium dialkyl or halide of magnesium alkyl, and the sum between the titanium and the metal or metals M, ranging from 1:1 to 30:1, and with an atomic ratio between the titanium and the metal or metals M of 0.1:1 to 2:1.

11. Solid component of catalyst according to claim 1, wherein, in step (i), a solid granular support is suspended.

12. Catalyst for the (co)polymerization of ethylene including the solid component of catalyst according to claim 3 and an organometallic compound of aluminium.

13. Solid component of catalyst according to claim 5, wherein the molar ratio between said alkyl halide and said tin halide is between 0.1:1 and 10:1.

14. Solid component of catalyst according to claim 4, wherein the tin (IV) halide is comprised of tin tetrachloride.

15. Solid component of catalyst according to claim 6, wherein the alkyl halide is selected from ethyl bromide, butyl chloride, hexyl chloride, octyl chloride and cyclohexyl chloride.

16. Solid component of catalyst according to claim 8, wherein said titanium compound is comprised of titanium tetrachloride.

17. Solid component of catalyst according to claim 9, wherein step (ii) is carried out at a temperature of from 60° to 90° C.

18. Solid component of catalyst according to claim 9, wherein step (ii) is carried out for a period of about 1-2 hours.

19. Solid component of catalyst according to claim 11, wherein the solid granular support is comprised of microspheriodal silica.

* * * * *